United States Patent [19]

Thorn et al.

[11] 3,880,447
[45] Apr. 29, 1975

[54] CRASH RESTRAINT INFLATOR FOR STEERING WHEEL ASSEMBLY

[75] Inventors: William F. Thorn, Mercer Island; Thomas W. Smelser, Woodinville, both of Wash.

[73] Assignee: Rocket Research Corporation, Redmond, Wash.

[22] Filed: May 16, 1973

[21] Appl. No.: 360,682

[52] U.S. Cl. .............. 280/150 AB; 23/281; 102/39
[51] Int. Cl. .......................................... B60r 21/08
[58] Field of Search ............... 280/150 AB; 102/39; 23/281

[56] References Cited
UNITED STATES PATENTS

| | | | |
|---|---|---|---|
| 3,411,807 | 11/1968 | Carey | 280/150 AB |
| 3,414,292 | 12/1968 | Oldberg | 280/150 AB |
| 3,527,472 | 9/1970 | Chute | 280/150 AB |
| 3,552,769 | 1/1971 | Kemmerer | 280/150 AB |
| 3,649,045 | 3/1972 | Smith | 280/150 AB |
| 3,663,035 | 5/1972 | Norton | 280/150 AB |
| 3,666,289 | 5/1972 | Magyar | 280/150 AB |
| 3,692,495 | 9/1972 | Schneiter | 280/150 AB |
| 3,785,674 | 1/1974 | Poole et al. | 280/150 AB |

*Primary Examiner*—David Schonberg
*Assistant Examiner*—John P. Silverstrim
*Attorney, Agent, or Firm*—Graybeal, Barnard, Uhlir & Hughes

[57] ABSTRACT

A crash restraint inflating system to inflate a protective cushion for the occupant in a crash situation. There is an inflating device comprising an inner cylindrical container with a gas producing composition therein, which discharges its combustion products into an outer cylindrical container circumjacent the inner container and having a porous gas conditioning composition therein to remove undesired components from the combustion products from the gas producing composition. The device is particularly well adapted for mounting at the center of an automotive steering assembly for driver protection. In such an installation the inflating device is positioned so that its lengthwise axis is parallel and adjacent to the plane defined by the steering wheel.

In one steering wheel embodiment, the outer container has gas discharge openings spaced around substantially its entire lateral circumference (i.e. cylindrical lateral surface). An inflating gas redirecting plate, shaped as half a cylindrical container is positioned around the forwardly facing portion of the inflating device to redirect forwardly discharged inflating gas in a rearward direction into an inflatable bag to deploy the bag in its inflated protective position between the automobile steering assembly and the driver of the automobile.

In a second embodiment, there are discharge openings only on the rearward half of the cylindrical lateral surface of the outer container. Adjacent to the inner surface of the forward half of the outer container is a plenum which provides a passageway for the gaseous discharge from the gas conditioning composition to pass from the forward portion of the outer container to the discharge openings in the rearward portion of the outer container.

11 Claims, 7 Drawing Figures

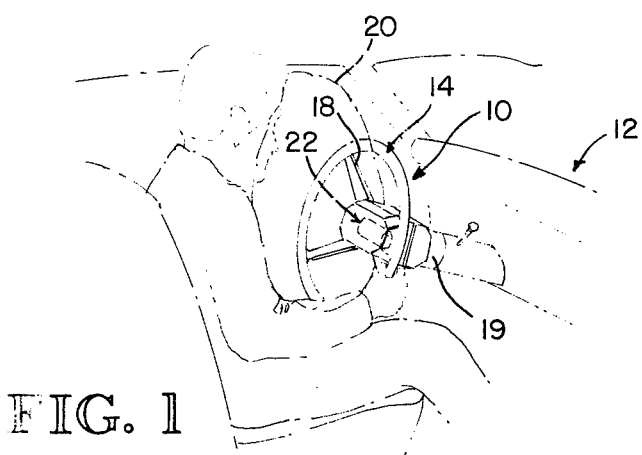
FIG. 1
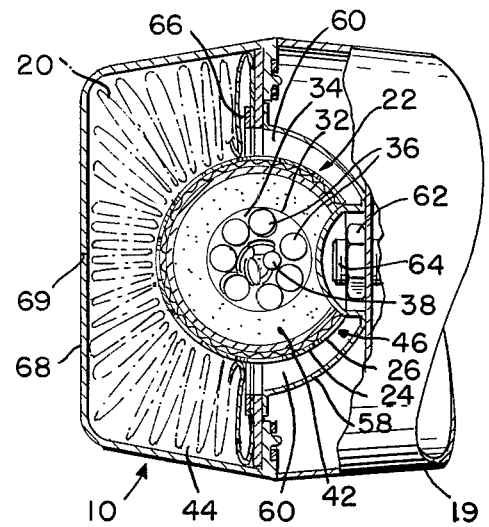
FIG. 3
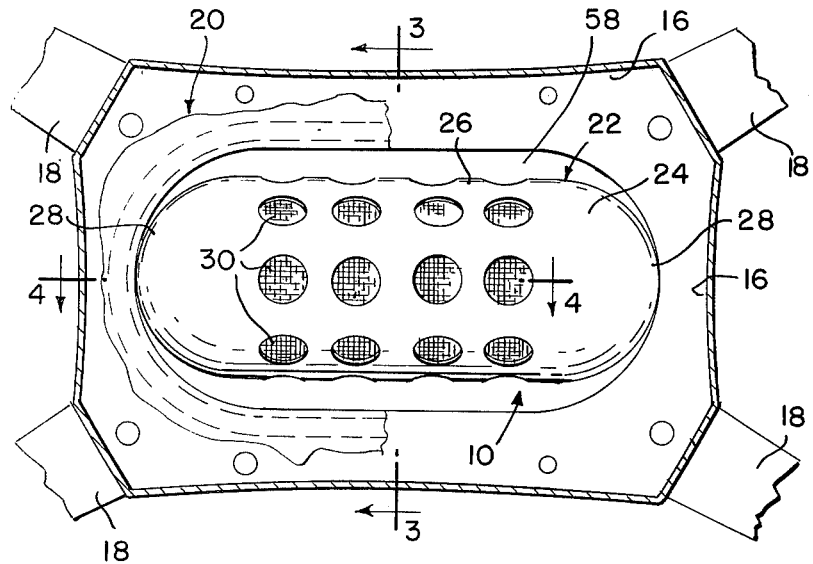
FIG. 2
FIG. 5
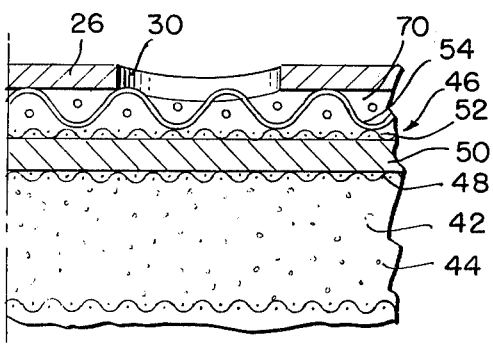
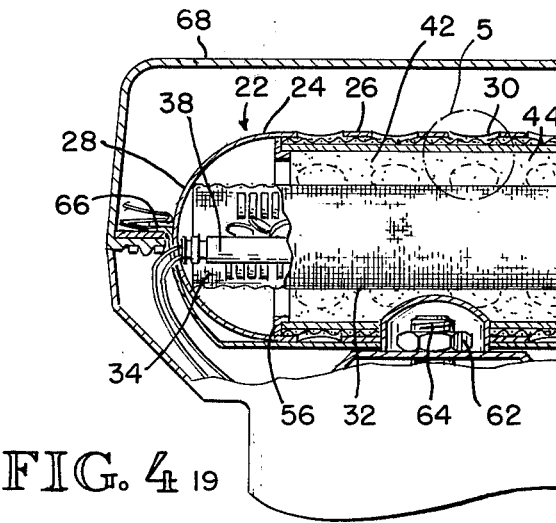
FIG. 4

CRASH RESTRAINT INFLATOR FOR STEERING WHEEL ASSEMBLY

BACKGROUND OF THE INVENTION

1. Field of the Invention

This invention relates to a crash restraint apparatus in which a confinement or bag is inflated to prevent an occupant of an automobile from being thrown violently against the steering wheel, dash board or other automobile structure, and more particularly to an improved inflating device for such apparatus, which inflating device is especially adapted to being mounted in the steering wheel of an automobile.

2. Description of the Prior Art

There are in the prior art various devices which cause a protective bag to inflate in front of an automobile driver or passenger to cushion him from impact with the steering wheel, dash board or other vehicle structure. Usually the device is activated by an inertial switch responsive to a crash impact of the automobile. This inertial switch in turn causes an inflating device to quickly inflate a collapsed bag into its protective position deployed in front of the driver or passenger. The inflating gas is generally supplied either from a source of compressed air or other compressed gas, such as shown in Chute, U.S. Pat. No. 3,411,808 and Wissing et al., U.S. Pat. No. 3,413,013, and a number of other patents in the crash restraint field. In several other prior art patents (e.g. Kobori, U.S. Pat. No. 3,450,414; Teague et al., U.S. Pat. No. 3,532,359; and Selwa et al., U.S. Pat. No. 3,532,358) the bag is inflated by igniting a composition and directing the gaseous combustion products of the composition directly into the bag.

One of the problems with providing such a crash restraint system for protection of the driver of the automobile is how to arrange and position the apparatus in the area of the steering wheel and steering wheel column. For reasons of styling and consumer acceptance, as well as for reasons of not interfering with the driver's movement or vision of the instrument panel, or not degrading steering dynamics it is desirable to arrange the crash restraint apparatus as conveniently as possible, and yet have it arranged so the apparatus effectively accomplishes its intended protective function. Further, since an inflating device for such a crash restraint system is capable of discharging a relatively large volume of gas in a very short period of time (e.g. 20 milliseconds), there are safety considerations not only in the depolyment of the inflating device in the automobile, but also with regard to such things as handling, installing, replacing and repairing such inflating devices. In the particular case of a steering wheel installation, low weight of the inflating device is important for several reasons. Since the wheel assembly is in a cantilevered position at the end of a steering column, excessive weight in the wheel area can cause excessive column whip from vertical accelerations from road shock inputs (e.g., bumps or chuckholes) in turn leading to degraded if not loss of driver control. If, for reasons such as styling, driver vision line clearance or other, the inflator is required to be located assymetrically with respect to the steering column centerline, excessive weight will add excessive resistive wheel turning torque, thus degrading the rotational dynamics of the steering assembly and providing potential for loss of driver control or other unusual or undesirable vehicle handling "feel" under some driving conditions.

Two prior art patents (Chute, U.S. Pat. No. 3,539,200 and Kemmer et al., U.S. Pat. No. 3,552,769) show a cylindrical container of a high pressure inflating gas being mounted within the steering wheel of the automobile. In a crash situation, the container is ruptured to cause the high pressure gas to pass through the container to inflate the bag to its protective position.

SUMMARY OF THE INVENTION

In a first embodiment of the present invention, there is an inflating device having a longitudinal axis and a lateral circumferential generally cylindrical surface with inflating gas discharge openings positioned around at least a substantial portion of the 360° of the lateral surface, whereby inflating gas is discharged from said device radially outwardly at least substantially in opposing directions. This device is mounted within an automobile steering assembly symmetrically on the column centerline with its longitudinal axis horizontally arranged with the wheel in the drive-ahead position and generally parallel and adjacent to a plane defined by the steering wheel rim. There is a gas redirecting means located about the forward portion of the inflating device to redirect forwardly directed inflating gas into an inflatable to deploy the inflatable in its protective inflated position.

In the preferred form, the inflating device comprises an inner container defining a combustion chamber having therein a gas producing composition. There is a second outer container enclosing the inner container and defining with the inner container an outer gas conditioning chamber containing a gas conditioning composition to remove at least one undesired component from the gaseous discharge of the gas producing composition. Desirably, the inner and outer containers are generally cylindrical and concentrically arranged, with both the inner and outer containers having outlet openings about substantially the entire cylindrical surface of each. The inner container discharges its gaseous combustion products radially in substantially a 360° pattern into the annular gas conditioning chamber, with the resulting inflating gas from the outer container also being discharged in a radially diverging pattern substantially about the entire 360°. Thus the gaseous discharge from the inflating device is in opposing directions to produce counter-acting thrusts in the event of any accidental activation of the device during handling, installation, etc., of the device. Further, since the gaseous discharge from the inner chamber is in a radially diverging pattern, the functioning of the gas conditioning composition is improved in that the expansion of the gas lowers the temperature and pressure to facilitate condensation and filtering of undesired combustion components, as well as alleviate pressure drop through the porous gas conditioning material and thereby provide a lower weight device. The cylindrical arrangement of the device with generally increased aspect ratio (e.g. length to diameter ratio greater than one), and the use of domed end caps further contributes to providing a lower weight device than is possible with larger diameter designs in turn providing a major advantage for utilization in steering-wheel-mounted restraint systems. Since, with all other factors being essentially equal, increased weight is generally associated with increased cost for this type of device, decreased weight with the present invention may be expected to result in lower costs when mass produced thus affording another major advantage of this design. A further advantage of the configuration resulting from the length to diameter ratio, is minimum intrusion on the driver vision of the instrument panel. The comparatively small diameter permits location of the device symmetrically on the steering column centerline without such vision interference and thereby also eliminates torque or resistive inertia of the wheel resulting from weight being located assymmetrically on the wheel.

In a second embodiment, the inflating device is generally similar to the inflating device of the first embodiment, except that there are discharge openings only on the rearward half of the inflating device. To provide a passage for the gaseous discharge from the forwardly positioned gas conditioning material to travel to the discharge openings, there is a plenum located against the inside surface of the forward half of the outer container. Desirably this plenum is in the form of one or more screens providing a plenum space of sufficient size to permit an adequate flow of gaseous discharge therethrough to the discharge openings.

BRIEF DESCRIPTION OF THE DRAWINGS

FIG. 1 is an isometric view illustrating the first embodiment of the present invention installed within a steering assembly of an automobile;

FIG. 2 is a view of the first embodiment of the present invention looking forwardly into the center portion of the automobile steering wheel, with the collapsed inflatable being only partially shown;

FIG. 3 is a sectional view taken along line 3—3 of FIG. 2;

FIG. 4 is a view taken along line 4—4 of FIG. 3;

FIG. 5 is an enlarged view of an outer wall portion of the inflating device, circled at 5 in FIG. 7;

DESCRIPTION OF THE PREFERRED EMBODIMENTS

Figure 6:
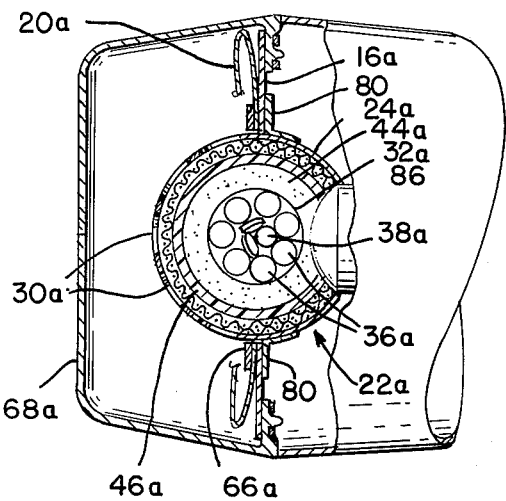
FIG. 6 is a view similar to FIG. 3, but showing a second embodiment of the present invention.

With reference to FIG. 1, the crash restraint apparatus 10 of the present invention is shown mounted on the steering assembly of an automobile 12, which steering assembly comprises a steering sheel 14, a center mounting structure 16, four radial spokes 18 connecting the wheel 14 to the center structure 16, and a steering column 19. The apparatus 10 comprises an inflatable bag 20, which in FIG. 1 is shown in dotted lines in its inflated protective position, and an inflating device 22, located generally forwardly of and adjacent to the bag 20.

The inflating device 22 comprises an elongated outer housing or container 24 made up of a cylindrical side wall 26 and two hemispherical end walls 28. At spaced locations along substantially the entire length and circumference of the cylindrical side wall 26 are a plurality of discharge openings 30 from which inflating gas is emitted into the bag 20.

Mounted concentrically within the outer container 24 is an inner cylindrical container or housing 32, which defines an inner gas producing combustion chamber or zone 34. In this chamber 34 are a plurality of pellets 36 of a suitable gas producing composition (e.g. such as a composition made up of 80% sodium azide and 20% potassium perchlorate). Also within the chamber 34 is an igniter 38 to initiate combustion of the pellets 36.

The inner container 32 is made of a fine mesh metallic screen (e.g. an 80 mesh screen), so that there are a plurality of small outlet openings about substantially the entire length and circumference of the inner container 32. The openings of the screen container 32 are closed by a suitable material which ruptures, vaporizes, decomposes or otherwise opens the screen openings upon combustion of the pellets 36. Such closure material is conveniently provided by dipping the screen container 32 into a waterglass solution and permitting the solution covering the screen container 32 to dry to form a dry film thereon. Upon ignition of the pellets 36, this film immediately decomposes or evaporates to permit outflow of the combustion products of the pellets 36 from substantially the entire circumference of the inner container 32.

The outer container 24 and inner container 32 define therebetween an outer annular gas conditioning chamber or zone 42 which substantially encloses the inner gas producing combustion chamber 34. This gas conditioning chamber 42 is filled with a suitable porous material 44, such as alumina or silica, which functions to remove one or more undesired components from the combustion products from the gas producing composition 36.

Surrounding the gas conditioning composition 44 and located adjacent the inside surface of the outer housing 24 is a final filter assembly 46. This assembly 46 comprises a first inner fine mesh screen 48, a layer of a suitable filtering material 50, such as fiberglass, a second fine mesh screen 52 surrounding the filtering material 50, and finally an outermost relatively coarse screen 54 (e.g. a 14 mesh screen) located immediately adjacent the inner surface of the outer housing 24. This filter assembly 46 is held in place by retaining rings 56 positioned within the outer housing 24. Also, the ends of the filter assembly are sealed with a sealant (such as a silicone rubber compound) with said sealant being located between the filter assembly 46 and the retainer ring 56.

The inflating device 22 is so mounted in the steering wheel assembly that the longitudinal axis (i.e. lengthwise axis) of the inflating device 22 is generally parallel to, and closely adjacent to, the plane defined by the steering wheel 14. Surrounding the forward portion of the inflating device 22 is a flow redirecting plate 58, which has the general configuration of a longitudinal half section of a cylindrical member with hemispherical and portions, the diameter of the plate 58 being moderately greater than that of the inflating device 22. Thus the plate 58 defines with the inflating device 22 a semi-annular passageway 60 to receive the inflating gas emitted forwardly from the device 22 and redirect this gas rearwardly from the passageway 60 into the bag 20.

This redirecting plate 58 is connected at its peripheral portions to the aforementioned center structure 16 of the steering wheel assembly. The plate 58 and inflating device 22 are mounted by means of a lock nut 62 to a mounting stud 64 connected to the steering column 19. The bag 20 is mounted to the center structure 16 by means of a retaining member 66. A removable cover 68 encloses the collapsed bag 20, with the cover 68 breaking open along a longitudinal break line 69 and moving laterally out of the way upon inflation of the bag 20.

In a crash situation, a suitable crash sensing means (such as one of the inertial switches shown in the prior art) activates a voltage source to cause ignition of the combustion pellets 36 by means of the igniter 38. The combustion products from the pellets 36 move outwardly from the combustion chamber 34 through the screen container 32 radially at a substantially 360° dispersion into the annular conditioning chamber 42. In this chamber 42 the gas conditioning composition 44 removes one or more undesired combustion products from the combustion products. With the gas producing composition being made up of 80% sodium azide and 20% potassium perchlorate, such undesired combustion products are sodium oxide, potassium chloride, and possibly some free sodium. It is believed that this removal function is accomplished by a combination of filtering out, condensing out and reacting out such undesired combustion products. Since the combustion products are traveling in a radially expanding direction, the rate of pressure drop in an outward direction decreases. Further, since the gaseous combustion products are expanding, there is a pressure and temperature reduction which facilitates the condensing out and filtering out of undesired combustion products.

The inflating gas passing from the gas conditioning composition 44 is primarily free nitrogen. This free nitrogen passes through the final filter assembly 46 and out the discharge openings 30 in the outer cylindrical housing 24. The outermost relatively coarse screen 54 in the filter assembly 46 functions to provide an outer passage 70 by which the inflating gas from various portions of the conditioning material 44 can pass into the discharge openings 30.

The gas emitted forwardly from the inflating device 22 is redirected by the plate 58 rearwardly toward the bag 20. This gas plus that emitted rearwardly from the device 22 causes rapid inflation of the bag 20 to its inflated protective position, as shown in FIG. 1.

In the handling of the inflating device 22 (e.g. in the initial installation, shipping, replacement of the device, etc.) if there is an accidential ignition of the gas producing composition pellets 36, the outflow of gases is in a substantial 360° dispersion, so that various portions of the gases are discharged in opposing directions to equalize substantially the thrust forces on the inflating device 22. This greatly alleviates any tendency to accelerate the device 22 and thus substantially reduces the danger associated with any accidental ignition.

Figure 7:
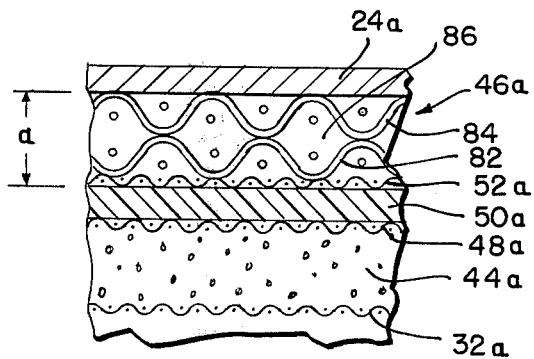
FIG. 7 is a view similar to FIG. 5, but taken through the forward portion of the device and further illustrating the second embodiment.

In FIGS. 6 and 7 is shown a second embodiment of the present invention. Components of this second embodiment similar to components of the first embodiment are given like numerical designations, with an $a$ suffix distinguishing those of the second embodiment. While not so illustrated in FIGS. 6 and 7, it is to be understood that the apparatus of the second embodiment is positioned in the steering wheel assembly of the automobile in a manner similar to the first embodiment.

As in the first embodiment, there is a collapsed inflatable 20a enclosed by a removable cover 68a. There is an inner container 32a containing gas producing pellets 36a and a suitable igniter 38a. Surrounding the inner container 32a is an outer container 24a, in which is a gas conditioning material 44a.

Discharge openings 30a are located along the rearward half of the lateral cylindrical surface of the outer container 24a, while the forward half of the container 24a is substantially imperforate. The outer container 24a is connected to the steering assembly center structure 16a by means of a pair of longitudinally extending angle brackets 80 connected to the outer container 24a at or slightly forward of a longitudinally aligned plane passing approximately between the forward and rearward portions of the inflating device 22a, these brackets 80 providing a seal between the bag 20a and the inflating device 22a. The bag 20a is mounted to the inflating device 22a by means of a suitable retaining member 66a.

There is a final filter assembly 46a, the rearward half of which is generally similar to the final filter assembly 46 of the first embodiment. However, the final filter assembly 46a at the forward half of the inflating device 22a, while having two fine mesh screens 48a and 52a enclosing a filter material 50a, differs from the filter assembly of the first embodiment in that instead of having a single outermost coarse screen, there are two layers of coarse screen 82 and 84 adjacent the inner surface of the outer container 24a. These two coarse screens 82 and 84 provide a plenum 86 at the forward inner surface portion of the outer container 24a. This plenum 86 extends rearwardly to approximately the middle of the upper and lower rows of holes 30a. The thickness dimension of the plenum 86, indicated at $a$ in FIG. 7, is sufficiently large so that the flow of gaseous discharge into the plenum 86 can proceed to the upper and lower rows of holes 30a. In an inflating device such as shown in FIGS. 6 and 7, having a diameter of 2.75 inches and a total length of 7 inches, five rows of four holes 30a each of 0.65 inches in diameter, and capable of providing about 3.4 cubic feet of inflating gas at atmospheric pressure within about 25 milliseconds, it was found that it was possible to obtain adequate flow through the plenum 86 with the thickness dimension of the plenum, $a$, being about one-tenth of an inch. This thickness dimension can be accomplished by utilizing a single 8 mesh to the inch screen to form the plenum or two 14 mesh to the inch screens, as shown in the accompanying drawings.

In a crash situation, upon ignition of the pellets 36a, the combustion products of the pellets 36a move radially outwardly through the conditioning material 44a. The inflating gas passing from the rearward portion of the conditioning material 44a passes out the openings 30a into the bag 20a as in the first embodiment. The inflating gas which passes from the forward portion of the conditioning material 44a passes into the plenum 86 formed by the two coarse screens 82 and 84 and travels to the rearward portion of the container 24a to pass out the rearwardly directed outlet openings 30a into the bag 20a.

What is claimed is:

1. In combination with an automobile steering assembly wherein there is a steering wheel and a central support structure, a crash restraint apparatus adapted to protect a driver of the automobile from impact with said steering assembly or other automobile structure, said apparatus comprising:

a. a collapsed inflatable mounted generally adjacent said central structure and disposed so that upon being inflated the inflatable is positioned between said driver and said steering assembly, b. an inflating device to provide inflating gas for said inflatable to deploy said inflatable to a protective position, said inflating device having a longitudinal axis and comprising:
1. an elongate outer housing having a generally cylindrical lateral circumferential surface generally surrounding said longitudinal axis,
2. said device having in said housing an inner gas generating zone having a gas producing composition located generally along said longitudinal axis,
3. said device having in said housing a gas conditioning zone having a gas filtering composition positioned radially outwardly of, and substantially surrounding, said gas generating zone to receive a combustion product from said gas producing composition and remove at least one undesired component from said combustion product to provide inflating gas for said inflatable,
4. said housing having a plurality of outlet openings located about a substantial portion of said lateral circumferential surface whereby inflating gas passes from said housing through said outlet openings in a diverging pattern,
c. said inflating device being located generally within and proximate said steering wheel, and positioned with its longitudinal axis having a substantial vector component generally parallel to a plane defined by said steering wheel.

2. The apparatus as recited in claim 1, wherein there is a gas redirecting means generally enclosing a forward portion of said housing and arranged to direct gas emitted from said device in a forward direction rearwardly into said inflatable.

3. The apparatus as recited in claim 2, wherein said redirecting means comprises plate means defining with said housing a passageway for flow of forwardly directed inflating gas rearwardly into said inflatable.

4. The apparatus as recited in claim 1, wherein there is means defining a plenum between said gas conditioning zone and said housing, whereby gas emitted from said gas filtering material flows at least partially in said plenum to travel through said plenum and out said outlet openings.

5. The apparatus as defined in claim 4, wherein said plenum defining means comprises at least one screen member positioned between at least a portion of said housing and said gas filtering material.

6. The apparatus as recited in claim 1, wherein there is an inner containing means containing said gas producing composition and having outlet means by which combustion products from said gas producing composition pass into said gas conditioning zone.

7. The apparatus as recited in claim 1, wherein said discharge openings are positioned mostly in a rearward portion of said housing, and a substantial part of a forward portion of said outer housing is substantially imperforate, said inflating device further comprising means defining a plenum between said gas conditioning zone and a forward portion of said housing, whereby gas emitted from said gas conditioning material flows at least partially into said plenum and rearwardly to pass out said outlet openings.

8. The apparatus as recited in claim 7, wherein said plenum defining means comprises at least one screen member positioned between said housing and said gas filtering material in at least the forward portion of said housing.

9. In a crash restraint apparatus having an inflatable to protect a driver of an automobile, an inflating device for said inflatable comprising:
a. an outer elongate housing having a longitudinal axis and a lateral generally cylindrical circumferential surface generally surrounding said longitudinal axis,
b. said device having in said housing an inner gas generating zone having a gas producing composition located generally along said longitudinal axis,
c. said device having in said housing a gas conditioning zone having a gas filtering composition positioned radially outwardly of, and substantially surrounding, said gas generating zone to receive a combustion product from said gas producing composition and remove at least one undesired component from said combustion product to provide inflating gas for said inflatable,
d. said housing having a plurality of outlet openings located about a substantial portion of said lateral circumferential surface whereby inflating gas passes from said housing through said outlet openings in a diverging pattern,
e. means defining a plenum between said gas conditioning zone and said housing, whereby gas emitted from said gas filtering material flows at least partially in said plenum to travel through said plenum and out said outlet openings.

10. The apparatus as recited in claim 9, wherein said plenum comprises at least one screen member separating said gas conditioning composition from said housing.

11. The apparatus as recited in claim 9, wherein said housing has a substantially imperforate portion, said plenum being located at said imperforate portion and communicating with at least some of said openings whereby gas flowing into said plenum from said gas conditioning zone flows through said plenum to said openings without a relatively large pressure drop.

* * * * *